United States Patent [19]

Thompson

[11] 3,899,307

[45] Aug. 12, 1975

[54] RESIN BONDED DIAMOND WHEELS WITH COPPER AND SILICON CARBIDE FILLERS

[75] Inventor: John R. Thompson, Westboro, Mass.

[73] Assignee: Dresser Industries, Inc., Dallas, Tex.

[22] Filed: Jan. 2, 1974

[21] Appl. No.: 429,996

Related U.S. Application Data

[63] Continuation of Ser. No. 88,502, Nov. 10, 1970, abandoned, which is a continuation-in-part of Ser. No. 812,453, April 1, 1969, abandoned, which is a continuation-in-part of Ser. No. 542,724, April 15, 1966, abandoned.

[52] U.S. Cl. .................................... 51/298; 51/293
[51] Int. Cl.² ...................... C08J 5/14; E09K 3/14
[58] Field of Search .............................. 51/295, 298

[56] References Cited
UNITED STATES PATENTS

| | | | |
|---|---|---|---|
| 3,383,191 | 5/1968 | Thomas | 51/298 |
| 3,385,684 | 5/1968 | Voter | 51/298 |
| 3,494,884 | 2/1970 | Kraft | 51/298 |
| 3,528,788 | 9/1970 | Seal | 51/295 |
| 3,592,618 | 7/1971 | Alden | 51/298 |

Primary Examiner—Donald J. Arnold
Attorney, Agent, or Firm—Raymond T. Majesko

[57] ABSTRACT

The invention is directed to a filler composition for an organic resin bonded grinding wheel. The filler is made up of two constituents, namely, a metal, mixtures of metals or alloys thereof, and particles of a second material having a hardness greater than that of the metal particles. The filler composition together with the bonding resin form a composite bond which forms a matrix surrounding the abrasive grains (grit) holding the abrasive grains together. The filler materials are chemically inert with respect to the resin and therefore may be used with any form of resin commonly used in the abrasive art. The size of the filler particles are smaller than the abrasive grit as is conventional in practice.

3 Claims, No Drawings

3,899,307

RESIN BONDED DIAMOND WHEELS WITH COPPER AND SILICON CARBIDE FILLERS

This application is a continuation of application Ser. No. 88,502 filed Nov. 10, 1970, which is a continuation-in-part of application Ser. No. 812,453 filed Apr. 1, 1969, which is a continuation-in-part of application Ser. No. 542,724 filed Apr. 15, 1966, all now abandoned.

This invention relates to a filler composition for an organic bonded abrasive wheel, and more particularly to an improved filler composition for organic bonded metal filled abrasive wheels of the type described in my U.S. Pat. No. 3,283,448. The above-mentioned patent relates to a grinding wheel which contains abrasive particles bonded with a resin; and also contains a particulate metallic filler of high thermal and electrical conductivity.

In particular, the high conductivity of the metal filled bond transfers heat generated by the grinding process away from the wheel face, reducing bond breakdown from thermal degradation. Wheels made according to this invention have achieved outstanding success in a number of applications. However, in certain other applications, even these wheels with their high thermal conductivity become too hot in the grinding operation, burn the work, and in extreme cases stall the machine. By the invention hereinafter described, these difficulties have been overcome, and a wheel has been developed that is suitable for use in these problem applications.

It is an object of the invention to provide a filler composition for an organic resin bonded abrasive article which avoids the limitations and disadvantages of prior designs.

It is an object of this invention to provide a filler composition to improve the cutting action of a metal-filled organic resin bonded grinding wheel for certain applications.

It is still another object of the invention to provide a filler composition for an organic resin bonded abrasive wheel that will give maximum useful life of the abrasive particles by providing a matrix which will hold the abrasive particles securely until they have become dulled, and then release them at the proper time so as to expose new abrasive particles for abrading action on the workpiece.

It is an object of the invention to provide a filler composition for an organic resin bonded abrasive article which utilizes a second filler in combination with the metal to accelerate the degradation of the bond.

It is an object of the invention to provide a filler composition for an organic resin bonded abrasive article which utilizes an abrasive as a second filler in combination with the metal to accelerate the degradation of the bond.

It is an object of the invention to provide a filler composition for an organic resin bonded abrasive article which utilizes particles of a material that is harder than the metal, in combination with the metal to accelerate the degradation of the bond.

It is an object of the invention to provide a method of softening the grinding grade of a metal filled organic resin bonded abrasive article.

It is an object of the invention to provide a method of softening the grinding grade of a metal filled organic resin bonded abrasive article by adding to the metal filler particles of a harder material.

As is well-known throughout the grinding wheel industry, great care must be taken to choose a grinding wheel with a suitable bond for the particular grinding job so that maximum useful life may be obtained from the abrasive grains. This is particularly important when premium priced abrasives, such as diamonds, are used as the abrasive. The bond must hold the abrasive grain firmly until the cutting points have been worn smooth, and then the grain must be released, exposing new, sharp cutting points. If the bond has inadequate strength, the abrasive will be prematurely released, the wheel will give short life, with accompanying high cost. If, on the other hand, the bond holds the abrasive particles too firmly, the grains are not released from the grinding face when they become dull, and the wheel glazes, loads and stops cutting.

The customary way to insure that the proper wheel is available for a particular grinding operation is to modify the strength of the bond by adding inorganic inert fillers to the bonding material—the organic resin—and develop a grade system. This is well-known in the grinding wheel industry, and requires little explanation. Wheels at the "hard" end of the grade system have an extremely tenacious bond, which holds each grain firmly throughout its maximum useful life. These wheels, when used on the proper operation, give long life, and the greatest economy. However, if a wheel is too hard, the abrasive particles will not be released from the bond, and the wheel will glaze and stop cutting. A "softer" grade wheel, which will break down more rapidly, must be chosen.

Grinding grade is often modified by altering the time and temperature of the cure, or it may be altered by adjusting the proportions of the filler/resin ratio, or by changing the resin. This invention utilizes neither of these known techniques. The grinding grade is adjusted by modifying the filler composition.

Fillers are bond modifiers. They are substances that are mixed with the bond material, in this case, an organic resin, to modify a bond for a particular purpose. As part of the bond a filler is functionally made non-abrasive regardless of its composition. The most common practice for accomplishing this is to make the filler material finer than the abrasive grit although it is also possible to judiciously choose a filler material which is not capable of abrading a particular material. For example, only diamonds are capable of grinding certain materials. It is therefore not surprising to find silicon carbide used as fillers in diamond grinding wheels, albeit usually in a finer particle size.

Some fillers are chemical catalysts, others produce pores or remove moisture while still others chemically attack the workpiece and act as grinding aid.

Some fillers act to modify the strength of the bonding material and it is to this function that the present invention is directed.

There exists a class of grinding wheels called metal filled organic bonded grinding wheels. This class of grinding wheels comprise abrasive grit, an organic resin bonding material such as the phenols, epoxies, polyimides, shellac and others, into which a metal filler has been uniformly distributed. The metal filler may be added to make the grinding wheel electrically and thermally conductive in which case copper, aluminum mixtures or alloys thereof are used as fillers. These metals and together with iron and other metals are also used to strengthen the bond. They are chemically inert with regard to the bonding material.

The metal filler acts as reinforcement. Instead of a pure resin matrix surrounding the abrasive grit and forming posts which reach from abrasive grain to abrasive grain holding them together, a metal resin composite matrix performs this function in metal filled abrasives. See the figure in the Ball U.S. Pat. No. 2,162,600.

Invariably the metal filler is smaller than the abrasive grit. Recalling that its function is to modify and strengthen the bonding material, it must be dispersed throughout the bonding material uniformly, it must be used in the most effective functional configuration, namely one in which the surface area to volume ratio is very high. It must also be of a suitable size to form a matrix for the abrasive grit and in this regard it must be distributed uniformly, in the non-uniform and random spaces between abrasive grains.

All of these criteria are met by a very fine filler powder normally substantially smaller than the abrasive grit; indeed this is the industry practice.

The use of metal fillers in organic resin bonded grinding wheels has a serious shortcoming. Heretofore there was no known way of softening the grinding grade of this type of wheel.

Grinding grade is the term used to denote the tenacity with which the bond—resin plus fillers—clings to the abrasive grit in time of stress, i.e., during grinding, and keeps the grit from falling out.

The invention is directed to a technique and structure for softening the grinding grade of the metal filled organic resin bonded abrasive wheel. Quite unexpectedly the concept accomplishes softening in a manner heretofore known to harden the grinding grade.

The concept calls for the addition of a second filler constituent material to the primary metal filler. Characteristically the second filler material is a material having a hardness greater than the hardness of the metal filler. Ceramics such as metal oxides and metal carbides and other hard materials such as silicon carbide and bauxite are preferred but the basic criteria for selecting the second filler is the comparative hardness of the filler materials. A second filler material to cooperate with a selected metal filler is easily chosen by referring to a handbook listing materials' hardness.

It is theorized that the second filler acts on the metal filler to abrade the bond just enough to quicken the release of abrasive grains and thus soften the grinding grade. To perform this function efficiently the size of the second hard filler is in the same order of magnitude as the metal filler and thus following industry practice it is dispersed uniformly in the bond as very fine powder.

The industry has historically used hard material as fillers. Materials such as alumina, silicon carbide, tungsten carbide, emery, flint, glass, etc., are very common. In each case where these are the sole grade modifier in the abrasive article, these materials harden the grade.

Quite unexpectedly the combination of a metal filler with a harder second filler, alumina, silicon carbide, etc., exhibits the diametrically opposite effect of softening the grinding grade.

Normally, when a grade system is developed, wheels that are harder in grinding grade or grinding action contain a bond composition which is also harder by conventional hardness measurements, such as Rockwell test, or any of the other familiar indentation hardness scales. These bond compositions are also stronger, having a higher modulus of rupture.

The metal-filled bond described in my patent has a rather low Rockwell hardness and modulus of rupture, but a surprisingly hard grinding action. Attempts to alter the grinding action of this wheel to make a softer acting wheel by conventional techniques were not successful. A highly workable solution stemmed from the discovery that a second filler could be substituted for a portion of the metal filler to achieve the desired result.

The second filler material selected belongs to a class of hard refractory and ceramic materials, and it was found that the inclusion of such material produced a bond composition which was harder on the Rockwell scale and had a higher modulus of rupture. This result is expected, but the surprising feature is that this unique bond composition had a softer grinding action, and the grinding grade became increasingly soft with increasing additions of the hard filler, while the bond composition itself became increasingly hard.

Table I below shows results obtained when sample test bars were made with varying proportions of the filler combination to confirm the physical characteristics of the bond:

TABLE I

| Filler Composition Vol. % in Bond | | Rockwell Hardness | Rupture Modulus lbs/in² | Grinding Grade of Wheels |
|---|---|---|---|---|
| Ceramic particles | Metallic particles | | | |
| 75 | 25 | 94.8 | sample blistered | Soft |
| 50 | 50 | 88.8 | 20,500 | ↓ |
| 25 | 75 | 83.7 | 19,700 | ↓ |
| 0 | 100 | 78.2 | 19,300 | Hard |

The use of hard inert particles as a filler in organic bonded wheels is not of itself a new concept. However, in all prior cases the effect of the addition of such fillers has been to make the grinding wheel harder in grinding action. This effect normally increases in direct proportion to the amount of hard filler added.

The unexpected result which was obtained in the invention wheel is believed to be due to a combination of effects. First, the hard particles which are used have an abrasive quality in themselves and give a dressing action on the bond and promote bond breakdown. Though the all metal filled wheel has a far greater thermal conductivity than the invention wheel, and though one would expect it to have a cooler cutting action, this effect does not materialize in certain problem applications. Unexpectedly, the invention wheel proved to be cooler cutting than the all-metal filled wheel, in those problems.

Table II represents results of actual tests made with wheels in applications where the all-metal filled wheel had been tried and found too hard in grinding action. The grade progression is designated numerically with "2" representing the hardest grade (next to the metal filled wheel) and "5" the softest grade made in the grade series.

TABLE II

| Application | Grade | Comments |
|---|---|---|
| Burr grinding | 2 | Free cutting; life double standard |

TABLE II-Continued

| Application | Grade | Comments |
|---|---|---|
| Burr grinding | 3 | Best wheel cover used |
| Burr grinding | 2 | Cut freely; triple normal life |
| Heavy infeeds | 5 | Satisfactory cut; life normal |
| Heavy infeeds | 3 | Life 2½ times standard |
| Off-hand grinding | 5 | Cutting action outstanding; life slightly low |

This apparent phenomenon may be explained thus:

In the case where the all-metal filled wheel is too hard in grade for a particular application, as the diamonds become dull, the cutting action stops, and the wheel merely rubs the workpiece, causing a tremendous amount of frictional heat which is transmitted throughout the wheel to the spindle. This effect is due entirely to the high conductivity of the bond containing the metal filler which transfers the heat away from the working face so effectively. The efficient transfer of heat prevents the necessary degradation of the bond.

On the other hand, with the filler composition of the invention wheel, as the diamonds start to become dull and drag, the frictional heat created, instead of being transferred rapidly throughout the wheel, tends to remain at the interface of wheel and workpiece, causing thermal degradation of the bond. At the same time the hard ceramic particles are causing a mechanical attrition of the bond. In addition, the hard particles have a higher coefficient of friction than the resin or metal filler, and actually generate more heat, increasing thermal breakdown rate of the bond. The rate at which abrasive particles are given up by the wheel is a direct function of the bond degradation rate.

The novel features that are considered characteristic of the invention are set forth in the appended claims; the invention itself, however, both as to organization and method of operation, together with additional objects and advantages thereof, will best be understood from the following description of a specific embodiment of the invention.

The materials preferably used in carrying out this invention comprise metal powders selected from those which have a thermal conductivity expressed in cal/cm$^2$/cm/sec/°C of over 0.500 and an electrical resistivity expressed in microohms/cm (at 68°C) of less than 3.0. These powders may be pure metallic elements, mixtures or powders of alloy metals.

The second filler material used in carrying out the invention is selected from a group of hard ceramic or refractory materials, such as silicon carbide, aluminum oxide, quartz, or other materials mentioned having a hardness greater than that of the metal.

The particle sizes of the metal and second fillers may be alike, in the order of 325 mesh each. The homogeneity of the wheel bond improves as the particle size of the filler decreases.

In a preferred embodiment of the invention, I use 325 mesh copper powder as the metallic ingredient, and 1000 grit silicon carbide as the hard ceramic component. Material designated as 1000 grit consists of particles of less than 20 microns with approximately 60% being of a particle size of less than 10 microns. The preferred resin used in this formulation is a Bakelite resin, BRP 5727 or 5717. The abrasive particles are diamonds, for example, in any grit size, depending upon finish and cutting rate requirements.

Stock removal is the principal purpose of the grinding wheels under discussion. The example in my U.S. Pat. No. 3,283,448 references 120 grit (mesh) abrasives, stock removal rates of 0.0059 to 0.0102 cubic inches/minute tungsten carbide. In virtually all, if not in all, cases calling for stock removal the industry recommends abrasive grit of 400 mesh or coarser.

Suitable alternatives for the diamond abrasive are alumina in any form, including fused, natural, or sintered alumina, emery, other abrasive oxides and certain hard carbides.

The organic bonding material most commonly used in these wheels is a phenol-formaldehyde resin such as specified above. The inventive concept, however, is directed to a novel filler composition for resinoid bonded abrasive articles. Further, the performance of the filler composition is essentially mechanical in nature, there being no chemical reaction between the abrasive or bonding material and the filler composition.

In view of the foregoing, the filler composition may be used with many types of synthetic or natural resinoid bonding material including those listed immediately below.

Such widely used thermo-setting bonding materials such as phenolaldehydes, epoxies, polyesters, modified phenolics, and the like, qualify.

Resins falling into the general class known as essentially linear aromatic polymers may also be used. Examples of essentially linear aromatic polymers are: aromatic polyimides, aromatic polyamides, aromatic polyketones, polybenzimidazoles, aromatic polyimines, polybenzotriazoles, and aromatic polythiazoles. Mixtures of resins may also be used according to known standard methods.

The abrasive portion of the wheel is preferably composed of the following formulation:

| Ingredient | Useful Range, Wt. % |
|---|---|
| Copper powder, 325 mesh | 20 – 70 |
| SiC, 1000 grit | 5 – 45 |
| Resin | 10 – 25 |
| Abrasive, 200 mesh or coarser | 3 – 30 |

Furfural is added as a wetting agent in the amount of 45 cc per pound of resin.

As is customary with diamond wheels, the abrasive section is attached to a core or preform. This core may be of any type commonly used in the industry, although a metallic or metal filled core is preferable. Obviously, fully homogeneous construction is used with oxide and carbide abrasives.

In the manufacture of the grinding rim, the metallic powder, the hard ceramic particles, and the abrasive are thoroughly mixed together, the wetting agent is added along with the pre-weighed powdered resin or resins. This mixture is molded onto the core or preform, hot pressed and cured in a 21-hour curing cycle at not over 400°F.

The unusual and unexpected result derived from the inventive concept is illustrated in Table III. Both classes of wheels use silicon carbide as a filler constituent to adjust the grinding grade of the respective class of wheels. In the metal filled line the silicon carbide replaces a specified quantity of metal filler from the basic V grade wheel. In the Mason Mate line silicon carbide is added as the sole strength modifier to R grade wheel which includes only an organic resin as the bond. Clearly diametrically opposite trends in grinding grade are observed.

The Mason Mate wheels follow the conventional pattern in that the hard particles are added for the purpose of reinforcing and strengthening the bond and the wheels produced become increasingly hard in grade as the hard filler is increased.

Note in particular from Table I that grade and hardness in metal-filled wheels decrease as the quantity of hard fines increases while in the other type of wheel the reverse is true.

TABLE III

| Metal Filled Line | | | Mason Mate Line | |
|---|---|---|---|---|
| Model No. | Hard Fines Content | Grade | Model No. | Hard Fines Content |
| V* | 0 | Hard | RC 26 | 33 Vol. % |
| T* | 10 Vol. % | Medium | RC 25 | 27 Vol. % |
| R* | 20 Vol. % | Soft | RC 24 | 0 |

(Organic Resin Bonded Lines)

*Standard marking system

Wheels made according to this invention have proved successful in many operations where the all-metal filled wheels of my patent have proved too hard in grinding action. They can be operated at higher-infeeds, are free-cutting and require little wheel dressing.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

The embodiments of the invention in which an exclusive property or privilege is claimed are defined as follows:

1. An abrasive grinding wheel having a relatively soft grinding grade comprising from 20 to 70% copper powder, from 5 to 45% silicon carbide filler, from 10 to 25% of a synthetic binder selected from the group consisting of a thermosetting polymer or linear aromatic polymer resin and from 3 to 30% diamond abrasive, the copper powder being in excess of 25% but less than 100%, by volume, of the silicon carbide filler, said copper powder and silicon carbide filler being finer than the diamond abrasive.

2. A grinding wheel according to claim 1 in which the size of the copper and silicon carbide are 325 mesh and finer.

3. The grinding wheel of claim 1 in which the size of the diamond abrasive is 400 mesh and coarser and the size of the fillers are 325 mesh and finer.

* * * * *